(12) United States Patent
Spottswood et al.

(10) Patent No.: US 10,678,552 B2
(45) Date of Patent: Jun. 9, 2020

(54) HARDWARE FOR SYSTEM FIRMWARE USE

(71) Applicant: HEWLETT PACKARD ENTERPRISE DEVELOPMENT LP, Houston, TX (US)

(72) Inventors: Jason Spottswood, Houston, TX (US); Andy Brown, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/565,206

(22) PCT Filed: Apr. 28, 2015

(86) PCT No.: PCT/US2015/027901
§ 371 (c)(1),
(2) Date: Oct. 9, 2017

(87) PCT Pub. No.: WO2016/175756
PCT Pub. Date: Nov. 3, 2016

(65) Prior Publication Data
US 2018/0060080 A1   Mar. 1, 2018

(51) Int. Cl.
*G06F 9/44* (2018.01)
*G06F 9/4401* (2018.01)
*G06F 21/62* (2013.01)

(52) U.S. Cl.
CPC ........ *G06F 9/4403* (2013.01); *G06F 21/6209* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| 6,725,178 B2 * | 4/2004 | Cheston | G06F 9/4401 |
| | | | 702/186 |
| 8,560,822 B1 * | 10/2013 | Chan | G06F 8/65 |
| | | | 713/1 |
| 8,671,241 B2 | 3/2014 | Molloy | |

(Continued)

OTHER PUBLICATIONS

NVM Express and the PCI Express * SSD Revolution (Research Paper), Apr. 4, 2013, 48 Pages.

(Continued)

*Primary Examiner* — Zahid Choudhury
(74) *Attorney, Agent, or Firm* — Nolte Intellectual Property Law Group

(57) ABSTRACT

A method and a system for reserving a device for a system are provided herein. The method includes accessing a reserved device, where a basic input/output system (BIOS) uses the reserved device. The method includes initializing a register, via the BIOS firmware, to disable a port that connects to the reserved device. The method includes disabling the port that connects to the reserved device. The disabling may occur before the BIOS firmware transfers control of the system to an operating system. The disabling may hide the reserved device from the operating system and reserve the reserved device for the BIOS firmware without interference from the operating system.

20 Claims, 5 Drawing Sheets

(56) References Cited

U.S. PATENT DOCUMENTS

| | | |
|---|---|---|
| 2004/0030877 A1 | 2/2004 | Frid |
| 2009/0144533 A1* | 6/2009 | Mulcahy ............... G06F 21/575 |
| | | 713/2 |
| 2011/0161551 A1* | 6/2011 | Khosravi ................ G06F 21/80 |
| | | 711/103 |
| 2012/0017101 A1 | 1/2012 | So et al. |
| 2012/0260077 A1* | 10/2012 | Harmer .................. G06F 9/451 |
| | | 713/1 |
| 2013/0198311 A1 | 8/2013 | Tamir et al. |
| 2014/0173267 A1 | 6/2014 | Chiu |
| 2014/0317219 A1 | 10/2014 | Fitch et al. |
| 2014/0337540 A1 | 11/2014 | Johnson et al. |

OTHER PUBLICATIONS

NVM Express™: Unlock the Potential, (Research Paper), Jun. 2014, 91 Pages.
Search Report and Written Opinion received for PCT Application No. PCT/US2015/027901, dated Oct. 30, 2015, 08 pages.

* cited by examiner

200A

HARDWARE FOR SYSTEM FIRMWARE USE

BACKGROUND

In a computing system, a Basic Input/Output System (BIOS) refers to firmware instructions located in the Read-Only Memory (ROM). The BIOS firmware performs several functions such as initializing and testing the hardware components, loading the operating system from a mass memory device, and interfacing the hardware components of the computing system with the operating system. When the computing system is initially powered ON, the BIOS firmware takes control of the system and runs a series of test referred to as the Power-On Self-Test (POST) to ensure that the components of the system are in proper working order. After the completion of the POST, the BIOS firmware searches for and initializes a boot process to load the operating system. Once a boot program is found, the BIOS firmware loads the operating system and passes control of the computing system to the operating system.

BRIEF DESCRIPTION OF THE DRAWINGS

Certain examples are described in the following detailed description and in reference to the drawings, in which.

DETAILED DESCRIPTION

Figure 1A:
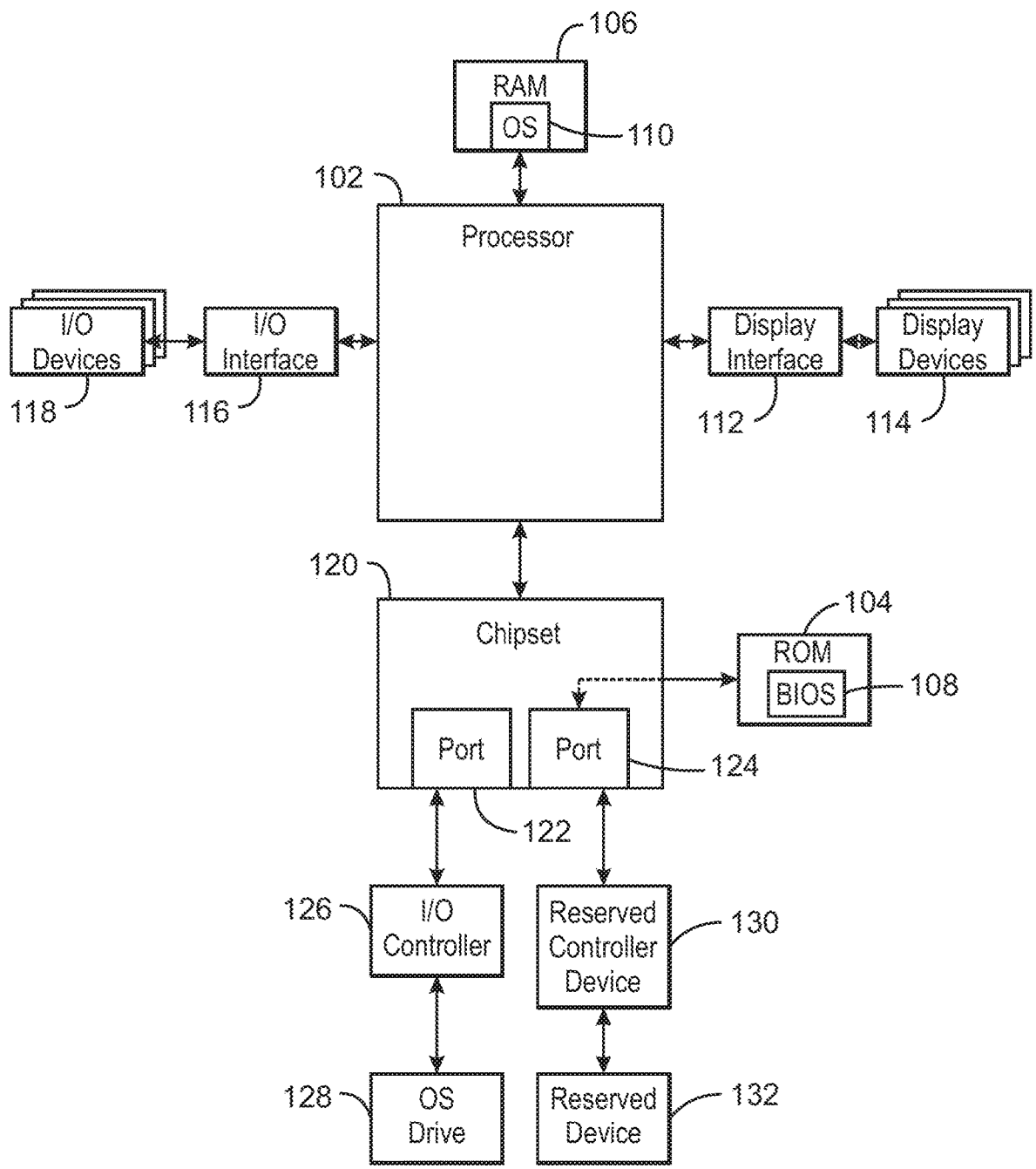
FIG. 1A is a block diagram of an example of a system.

The Basic Input/Output System (BIOS) is a type of firmware used during initialization of a computing system, for example, the boot-up process. The BIOS firmware may be in the form of a chip located on a motherboard of the computing system and may contain instructions and setup information related to initialization of the computing system, among other features. The BIOS firmware may use hardware devices of the computing system, including various types of controllers, ports, cards, and the like, to carry out various implementations. For example, the storage of data by the BIOS firmware into larger capacity storage devices has emerged as an alternative to limited storage capacity chips, such as ROM, PROM, EEPROM, and the like. However, after the BIOS firmware releases control of the computing system to an operating system (OS), the OS may detect the larger capacity storage device during a scan of the system. Once detected, the OS may take control of the storage device so as to render it unavailable for BIOS firmware use. Consequently, the BIOS firmware cannot use the larger capacity storage device. In some cases, data loss or corruption may occur if the BIOS firmware accesses the storage device while it is under the control of the OS.

To store the larger capacity data, the BIOS firmware may use hardware devices that include non-volatile storage technology such as Not AND (NAND) flash memory or a serial peripheral interface (SPI) flash memory. However, the use of NAND flash memory and SPI flash memory to store larger capacity data may involve performance and storage capacity issues. For example, with a data capacity of 4 gigabytes (GB), the storage capacity of the NAND flash memory may limit the amount of applications, data, and log information stored by the BIOS firmware. Moreover, due to its transfer bus speed, the SPI flash memory may slow data transfers and thus, limit performance capabilities of the BIOS firmware to store data.

As previously stated, the example of data storage to a larger capacity storage device by the BIOS firmware is merely one instance where the BIOS firmware may use the hardware of the computing system. In other examples, the BIOS firmware may use a network controller to carry out various features such as error reporting to a central server or remote management, and so forth. Further, the BIOS firmware may use other types of hardware devices including various types of controllers, ports, cards, and the like, to carry out various implementations.

Examples describe herein provide techniques for BIOS firmware to use hardware devices connected to a computing system. In particular, the BIOS firmware may reserve hardware devices connected to the computing system for use without interference from an operating system. In some examples, the BIOS firmware may use the hardware device for its own use during it boot-up process. After boot-up, but before the BIOS firmware transfers control of the computing system to the operating system, the BIOS firmware may initialize a register in a chipset to disable a port that connects to the hardware device. The disabling of the port may hide the hardware device attached to the port from the OS and as a result, reserve the device for the BIOS firmware without interference from the operating system.

FIG. 1A is a block diagram of an example of a system, for example, a computing system 100. The computing system 100 may include a laptop computer, desktop computer, tablet computer, server, or the like. The computing system 100 may include internal and external computing components where data can be transmitted among the computing components via a system of wires, e.g., a bus, as discussed herein.

In the present examples, the computing system 100 may include a processor 102 that is adapted to execute stored instructions, as well as memory devices that store data executable by the processor 102. The processor 102 can be a single core processor, a multi-core processor, a computing cluster, or any number of other configurations. A memory device, such as a random access memory (RAM) device 106, may be connected to the processor 102. The RAM device 106 may be used to store volatile memory contents that would otherwise be lost when the computing system 100 is powered off. In some examples, the RAM device 106 may include dynamic random access memory (DRAM) device, a static random access memory (SRAM) device, or any other suitable memory systems.

The computing system 100 may also include a ROM device 104, for example, an electronically erasable programmable read only memory (EEPROM) device or any other suitable memory systems. The ROM device 104 may store basic input/output system (BIOS) instructions that are often referred to as the BIOS firmware 108, as shown in FIG. 1A. The BIOS firmware 108 is software used to startup (boot) a computing system, and which may be used to interface the various computing components with an operating system (OS) 110. Specifically, the BIOS firmware 108 performs several functions including enabling a booting process to load the OS 110 into the RAM device 106 from disk storage. The OS 110, of the present examples, may include a software program used to manage hardware and software resources of the computing system 100.

The processor 102 may connect to a display interface 112 configured to connect the computing system 100 to one or more display devices 114. The display devices 114 may include a computer monitor, television, or projector, among other peripheral devices, that are externally connected or built into the computing system 100.

The processor 102 may also connect to an input/output (I/O) device interface 116 configured to connect the computing system 100 to one or more I/O peripheral devices 118. The I/O peripheral devices 118 may include, for example, a keyboard, a mouse, a printer, or a pointing device, among other peripheral devices, that are externally connected or built into the computing system 100.

A chipset 120 is electrically connected to the processor 102. The chipset 120 is a group of integrated circuits that manage the data flow between the processor 102 and other internal or external hardware devices. The chipset 120 may include ports to provide an interface between the processor 102 and other devices. As shown in FIG. 1, the chipset 102 includes two ports, 122 and 124, however, additional ports may be present. Depending on the specifications of the manufacturer, an internal hardware device, such as an I/O controller 126 may connect to the ports. For example, the I/O controller 126 may connect to the port 122. The I/O controller 126 may further connect to an OS drive 128 used by the OS 110, for example, as a storage device.

A hardware device, such as a reserved controller device 130, may connect to the port 124 and may further connect to a reserved device 132. In this manner, the reserved controller device 130 may act as an interface so as to provide an intermediary link between the processor 102 and the reserved device 132.

In certain examples, the reserved controller device 130 may be removed and the reserved device 132 may be directly attached to the port 124. For example, the reserved device 132 may include a network interface controller (NIC) directly attached to the port 124 to connect the computing system 100 to an external computing network.

In the present examples, the BIOS firmware 108 may perform a sequence of events after the computing system 100 is powered on. For example, the BIOS firmware 108 may perform diagnostic tests on computing components or load instructions related to the OS 110 from a disk to the RAM device 106, among other events. After the OS 110 is loaded into the RAM 106, the BIOS firmware 108 turns control of the computing system 100 over to the OS 110, which is ready for user interaction.

However, before the OS 110 is loaded into the RAM device 106, the BIOS firmware 108 may use the reserved device 132 to carry out various functions, such as for data storage or as a controller to connect the computing system 100 to a computer network. Thereafter, the BIOS firmware 108 may transfer control of the computing system 100 to the OS 110. In order to prevent the OS 110 from using the reserved device 132 after the OS 110 takes control, the BIOS firmware 108 may program the chipset 120 with configuration data to disable the port 124 that is connected to the reserved controller device 130, as will be further discussed with respect to FIG. 1B. The disabling of the port 124 may act to hide the reserved controller device 130 once the OS 110 takes control and initiates a configuration scan of the system 100. Further, the disabling of the port 124 may act to hide any devices located behind the device 130, such as, the reserved device 132. Once hidden, the reserved controller device 130 and the reserved device 132 may not be subjected to interference or use from the OS 110 or any other hardware or software of the computing system 100. In some examples, as will be further explained, the BIOS firmware 108 may use the reserved device 132 after the OS 110 takes control. In this case, the BIOS firmware 108 may initialize the register 136 with configuration data to enable the port 124 connected to the reserved device 132. The BIOS firmware 108 may then access the reserved device 132 for its own use and subsequently, disable the port 124 to hide the device 132 from the OS 110.

Figure 1B:
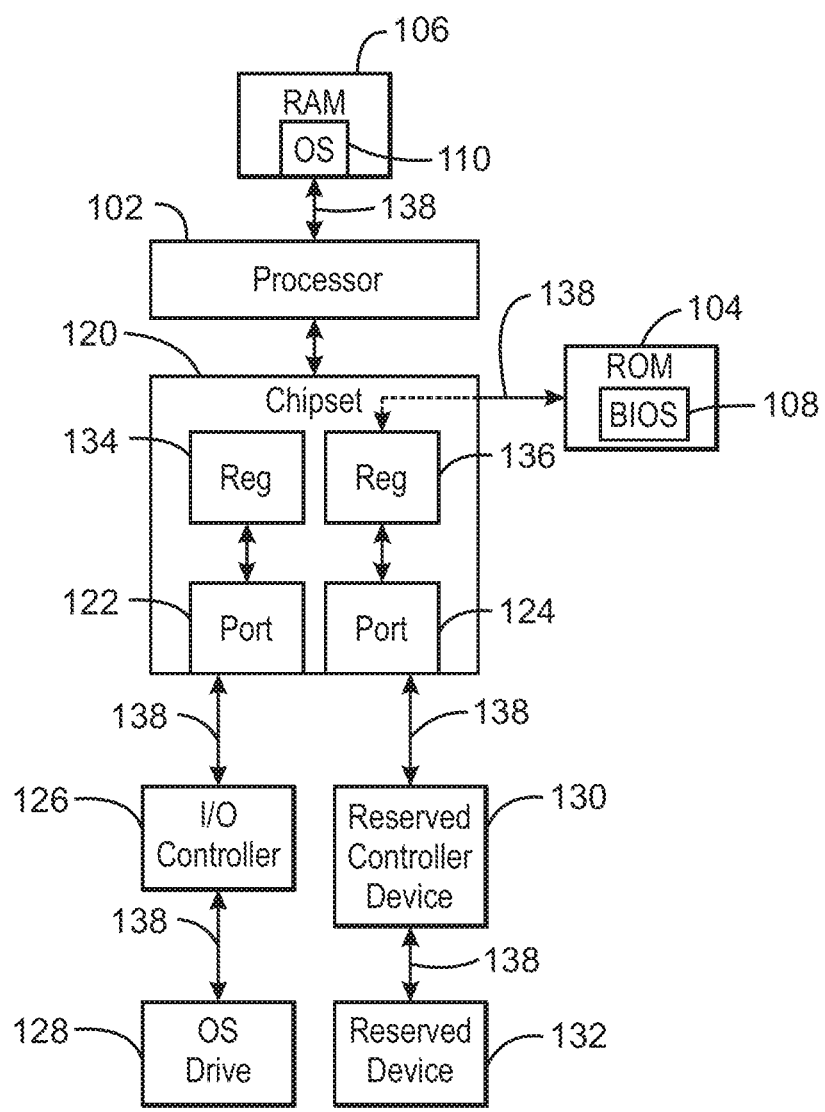
FIG. 1B is a block diagram of a another view of the example of the system.

FIG. 1B is a block diagram of a detailed view of the example of the system. Like numbered items are as described with respect to FIG. 1A. As previously discussed, the disabling of the port 124 may hide the reserved controller device 130 including the reserved device 132 connected thereto. To hide the reserved device 132 from the OS 110, the BIOS 108 may initialize a register located in the chipset 120 to disable the port 124 connected to the reserved controller device 130. As shown in FIG. 1B, the chipset 120 includes several registers, including registers 134 and 136. The registers 134 and 136 are data storage areas that may be used to control the behavior of the chipset 120 and its component parts, such as the ports 122 and 124. In the present examples, the register 136 may be a function disable register. Thus, the register 136 may be initialized to disable the port 124 to hide the reserved device 132 from the operating system 110.

A system bus 138, as used in the present examples, is a set of wires that electrically connect and move data between the internal and external devices of the computing system 100, as shown in FIG. 1B. The BIOS firmware 108 may electrically connect to the chipset 120 through the bus system 138 in order to write values into the register 136. Further, the system bus 138 may provide a common electrically pathway between the reserved controller device 130, the reserved device 132, and the port 124, among other devices of the computing system 100. A bus protocol is a set of rules that governs the operations of the system bus 138. In the present examples, the system bus 138 may use a peripheral component interconnect (PCI) bus protocol or a PCI Express (PCIe) bus protocol. Hence, the reserved controller device 130 may be a PCIe reserved controller device and the reserved device 132 may be a PCIe device. In the case of a storage implementation, the reserved controller device 130 may be a PCIe storage controller and the reserved device 132 may be a PCIe non-volatile solid-state storage device. In the present examples, the PCIe bus may be the primary bus standard as it may improve the efficiency of the reserved controller device 130 to transmit and receive data to and from the other hardware devices, for example, the ROM device 104.

As previously described, the disabling of the port 124 may occur before the BIOS firmware 108 transfers control of the computing system 100 to the OS 110. Once the OS 110 takes control, it may initiate a scan to determine the configuration of the computing system 100, for example, detecting coupled devices. However, the OS 110 may not detect the reserved controller device 130 and thus, the reserved device 132 connected thereto. Consequently, if the OS 110 desires to use a device, for example, for storage, it may select only the devices that are visible to it during the configuration scan, for example, the OS drive 128.

Other examples illustrate use of hardware devices by the BIOS firmware 108. In some examples, the BIOS firmware 108 may use hardware devices after control has passed to the OS 110. For example, power-loss to the computing system 100 may occur after the OS 110 has gained control. A power source may be switched to a battery-based power system and a back-up of the RAM device 106 may be initiated. The back-up may require the use of the reserved device 132, for example, a large capacity storage device. In the case where the port 124 was disabled before the OS 110 takes control, the BIOS firmware 108 may enable the port 124 connected to the reserved device 132. In particular, the BIOS firmware 108 may initialize the register 136 with values to enable the port 124 connected to the reserved device 132. Once enabled, the BIOS firmware 108 may initiate a full backup of the data to the reserved device 132. The port 124 may be disabled again after the BIOS firmware 108 completes the backup but before the OS 110 regains control. Consequently, the reserved device 132 may be hidden from the OS 110 after it re-initializes and retakes control.

Figure 2A:
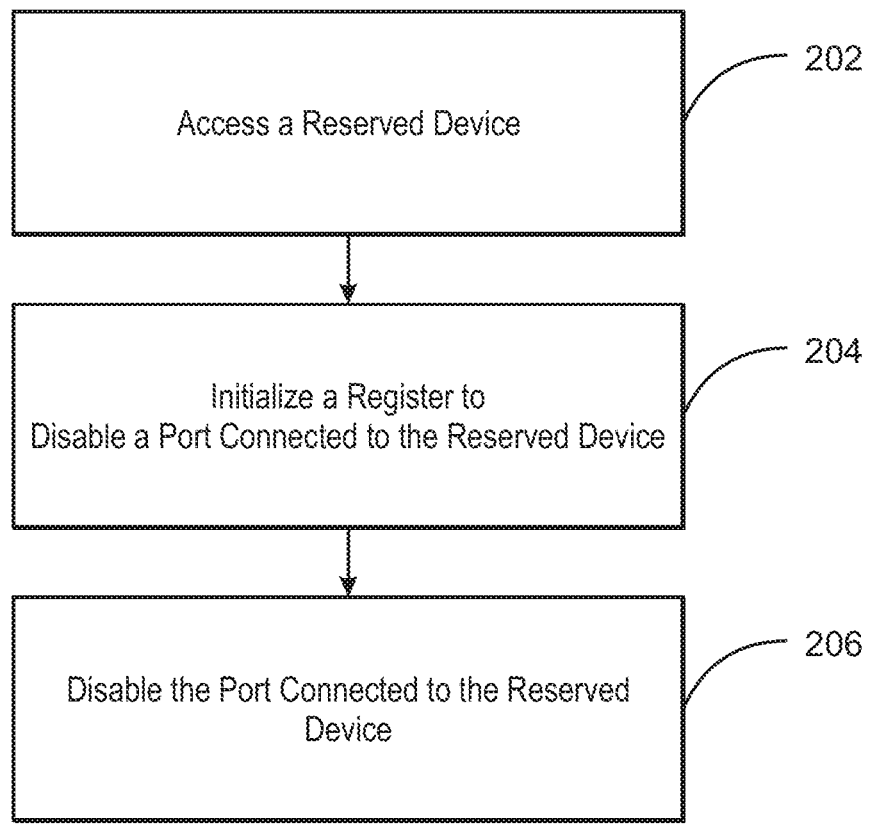
FIG. 2A is a process flow diagram of an example of a method for disabling a port in the system.

FIG. 2A is a process flow diagram of an example of a method for disabling a port in the system. The BIOS firmware controls the system from the initial start-up until the OS takes control of the system. In particular, one of the primary functions of the BIOS firmware includes loading the OS into the random access memory (RAM) of the system from disk storage. However, in some cases, the BIOS firmware may use hardware of the system to carry out various functions. In order to reserve the hardware for the BIOS firmware and to prevent the OS from using the hardware, a port connected to the hardware may be disabled to prevent the OS from detecting the hardware.

At block 202, the BIOS firmware may access the reserved device for use. In some examples, the BIOS firmware may use the reserved device for the storage of data or as a network controller to provide error reporting, among other implementations. At block 204, the BIOS firmware may initialize a register to disable a port connected to the reserved device. To initialize the register, the BIOS firmware may write values to the register. In the present examples, the values may instruct the register to disable the port connected to the reserved device. At block 206, the method includes disabling the port connected to the reserved device, where the disabling occurs before the BIOS firmware transfers control of the system to the OS. In some examples, the initializing may take place after the BIOS firmware passes control of the system to the OS. The disabling of the port hides the reserved device from the OS during a configuration scan of the system and thus, prevents the OS from using the reserved device. In this manner, the disabling of the port reserves the reserved device for the BIOS firmware use without interference from the OS.

Figure 2B:
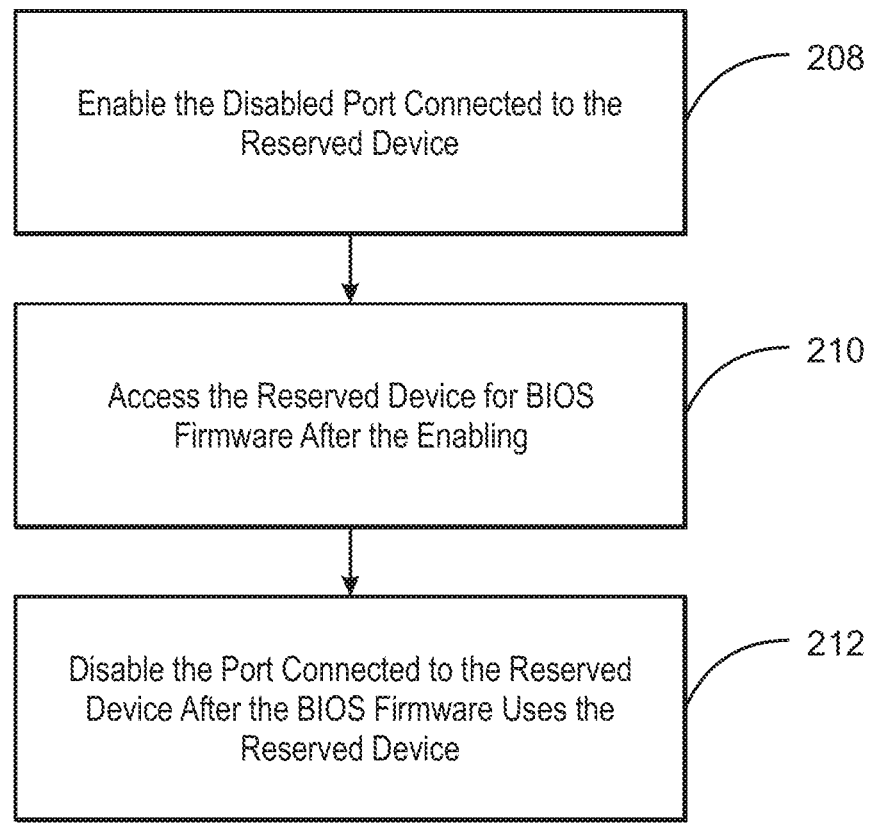
FIG. 2B is a process flow diagram of an example of a method for enabling and disabling a port in the system.

FIG. 2B is a process flow diagram of an example of a method for enabling and disabling a port in the system. In some examples, the need may arise for the BIOS firmware to be enabled after the OS has taken control of the system. For example, a disruption to the system may include a loss of power, among other disruptions that interrupt the operations of the system. Since the port connected to the reserved device is disabled prior to initiating the OS, as previously discussed, the port may need to be re-enabled for BIOS firmware use. At block 208, the method may include enabling the disabled port connected to the reserved device after the OS has taken control. The BIOS firmware may enable the port by writing values to the register to enable the port connected to the reserved device. At block 210, the method may include the BIOS firmware accessing the reserved device for use after enabling. At block 212, the method may include disabling the port connected to the reserved device after the BIOS firmware use but before the OS re-takes control of the system. The disabling of the port may hide the reserved device from the OS after it takes control.

Figure 3:
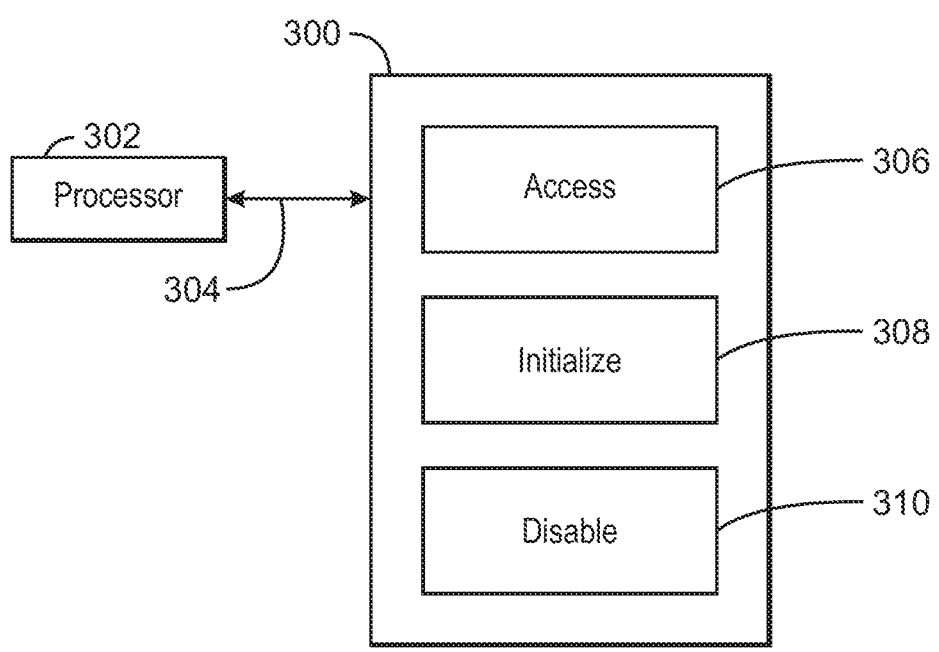
FIG. 3 is a block diagram of an example of a tangible, non-transitory, computer-readable medium that stores code configured to disable a port using BIOS firmware.

FIG. 3 is a block diagram of an example of a tangible, non-transitory, computer-readable medium 300 that stores code configured to disable a port using BIOS firmware. The computer-readable medium 300 may store code that can be accessed by a processor 302 over a computer bus 304 to perform the methods previously described. The computer-readable medium 300 can include a hard disk drive, a solid-state non-volatile storage device, a network controller, a graphics processor unit, among others.

The computer-readable medium 300 may include modules 306, 308, and 310. For example, an access module 306 may be configured to allow BIOS (basic input/output system) firmware to access a reserved device for use. An initialization module 308 may be configured to initialize a register in a chipset, via the BIOS firmware, to disable a port connected to the reserved device. The initialization module 306 may perform its operations before the BIOS firmware passes control of a system to an operating system (OS). A disable module 310 may be configured to disable the port connected to the reserved device, wherein the disabled port acts to hide the reserved device from the OS. The disabling of the port may occur before control of the system is passed to the OS so that the OS may not use the reserved device.

The BIOS firmware may use the reserved device for the storage of larger capacity data, to carry our various features for a network controller, among other implementations. In particular, the BIOS firmware may initialize a register with data values to disable a port connected to the reserved device. The disabling of the port may hide the reserved device from the OS. In this manner, the reserved device can be reserved for use by the BIOS firmware without interference from the OS.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

The invention claimed is:

1. A method of using firmware in a system, comprising:
   accessing a reserved device located behind a reserved controller device, wherein a basic input/output system (BIOS) firmware uses the reserved device;
   initializing a register, via the BIOS firmware, to disable a port connected to the reserved device; and
   disabling the port connected to the reserved device, wherein the disabling occurs before the BIOS firmware transfers control of the system to an operating system, wherein the disabling hides the reserved controller device, thereby hiding the reserved device from the operating system, and wherein the hiding reserves the reserved device for the BIOS firmware without interference from the operating system.

2. The method of claim 1, wherein the initializing comprises writing values to the register that instruct the register to disable the port connected to the reserved device.

3. The method of claim 1, wherein the initializing takes place before or after the BIOS firmware uses the reserved device.

4. The method of claim 1, comprising:
   enabling the disabled port connected to the reserved device after the operating system takes control; and
   accessing the reserved device for the BIOS firmware after the enabling.

5. The method of claim 4, comprising:
disabling the port connected to the reserved device after the BIOS firmware uses the reserved device, wherein the disabling hides the reserved device from the operating system after the operating system retakes control.

6. The method of claim 1, wherein the reserved device comprises a network interface controller.

7. The method of claim 1, wherein the reserved device comprises a non-volatile storage device, a controller, or a reserved port.

8. The system of claim 1, further comprising:
during a disruption to the system, enabling the port connected to the reserved device for the BIOS firmware; and
disabling the port connected to the reserved device prior to transferring control back to the operating system.

9. A system comprising:
a processor;
a chipset connected to the processor, wherein the chipset comprises a plurality of ports and a plurality of registers;
a non-volatile memory connected to the chipset,
a basic input/output system (BIOS) firmware, wherein the BIOS firmware is stored in the non-volatile memory;
a reserved controller device;
a reserved device, located behind the reserved controller device, connected to at least one port of the chipset, wherein the BIOS firmware initializes at least one register in the chipset to disable the at least one port connected to the reserved device, wherein the reserved device is reserved for BIOS firmware use; and
an operating system connected to the processor, wherein the reserved device is hidden from the operating system by the reserved controller device after the at least one port connected to the reserved device is disabled.

10. The system of claim 9, wherein the BIOS firmware writes values to the at least one register, and wherein the values instruct the at least one register to disable the at least one port connected to the reserved device.

11. The system of claim 9, wherein the at least one port connected to the reserved device is disabled prior to transferring control of the system to the operating system.

12. The system of claim 9, wherein during a disruption to the system, the at least one port connected to the reserved device is enabled for the BIOS firmware and disabled prior to transferring control back to the operating system.

13. The system of claim 9, wherein the reserved device is a non-volatile storage device, a controller, or port.

14. The system of claim 9, wherein the reserved device comprises a network interface controller.

15. A tangible, non-transitory, computer-readable medium comprising a processor to carry out instructions of using firmware in a system, the instructions comprising:
access a reserved device located behind a reserved controller device, wherein a basic input/output system (BIOS) firmware uses the reserved device;
initialize a register, via the BIOS firmware, to disable a port connected to the reserved device; and
disable the port connected to the reserved device, wherein the disabling occurs before the BIOS firmware transfers control of the system to an operating system, wherein the disabling hides the reserved controller device from the operating system, thereby hiding the reserved device from the operating system, and wherein the hiding reserves the reserved device for the BIOS firmware without interference from the operating system.

16. The tangible, non-transitory, computer-readable medium of claim 15, the instructions further comprising:
enable the disabled port connected to the reserved device after the operating system takes control; and
access the reserved device for the BIOS firmware after the enabling.

17. The tangible, non-transitory, computer-readable medium of claim 15, the instructions further comprising:
disable the port that connects to the reserved device after the BIOS firmware uses the reserved device, wherein the disabling hides the reserved device from the operating system after the operating system retakes control.

18. The tangible, non-transitory, computer-readable medium of claim 15, wherein the reserved device comprises a non-volatile storage device, a controller, or a reserved port.

19. The tangible, non-transitory, computer-readable medium of claim 15, wherein the reserved device comprises a network interface controller.

20. The tangible, non-transitory, computer-readable medium of claim 15, wherein initialize the register comprises writing values to the register that instruct the register to disable the port connected to the reserved device.

* * * * *